United States Patent [19]

Kovacs et al.

[11] Patent Number: 5,932,630
[45] Date of Patent: Aug. 3, 1999

[54] INK COMPOSITIONS

[75] Inventors: Gregory J. Kovacs, Mississauga; Michael K. Georges, Guelph; Fatima M. Pontes, Mississauga; Stephan V. Drappel, Toronto, all of Canada

[73] Assignee: Xerox Corporation, Stamford, Conn.

[21] Appl. No.: 08/641,866

[22] Filed: May 2, 1996

[51] Int. Cl.⁶ ........................ C09D 5/00
[52] U.S. Cl. ........................ 523/161
[58] Field of Search ................ 523/161

[56] References Cited

U.S. PATENT DOCUMENTS

| | | | |
|---|---|---|---|
| 4,490,731 | 12/1984 | Vaught | 346/140 R |
| 4,791,439 | 12/1988 | Guiles | 346/140 R |
| 4,822,674 | 4/1989 | Malhotra et al. | 428/336 |
| 4,847,144 | 7/1989 | Suzuki et al. | 428/321.5 |
| 5,006,170 | 4/1991 | Schwarz et al. | 106/20 |
| 5,041,161 | 8/1991 | Cooke et al. | 106/22 |
| 5,085,698 | 2/1992 | Ma et al. | 106/20 |
| 5,122,187 | 6/1992 | Schwarz et al. | 106/25 |
| 5,160,369 | 11/1992 | Parkinson et al. | 106/19 R |

FOREIGN PATENT DOCUMENTS

| | | |
|---|---|---|
| 0 556 649 A1 | 8/1993 | European Pat. Off. |
| WO 96/10051 | 4/1996 | WIPO. |

*Primary Examiner*—Edward J. Cain
*Attorney, Agent, or Firm*—E. O. Palazzo

[57] ABSTRACT

A hot melt ink composition comprised of a triblock copolymer vehicle, and a dye or pigment.

17 Claims, 1 Drawing Sheet

INK COMPOSITIONS

BACKGROUND OF THE INVENTION

The present invention is directed to ink compositions, and more specifically, the present invention relates to hot melt inks especially useful for ink printing, processes and apparatuses, reference for example U.S. Pat. No. 5,121,141, U.S. Pat. No. 5,111,220, U.S. Pat. No. 5,128,726, U.S. Pat. No. 5,371,531, U.S. Ser. No. 176,381 now abandoned, and U.S. Pat. No. 5,528,384, the disclosures of which are totally incorporated herein by reference, including especially acoustic ink processes as illustrated in some of the aforementioned copending applications and patents, such as an acoustic ink printer for printing images on a recording medium, comprising a source of several different-colored liquid inks cyan, magenta, yellow, and black (C, M, Y, K), which source possesses a free surface proximate to the recording medium with each of the different-colored inks appearing on the free surface in a predetermined order; an acoustic printhead adapted to be acoustically coupled to the source for radiating the ink appearing on its free surface with focussed acoustic energy, whereby radiation pressure is exerted against the different colored inks on the free surface, and a controller coupled to the printhead for modulating the radiation pressure exerted against the free surface of said source in accordance with data representing an image, whereby droplets of the different-colored ink are able to be ejected on command from the different bodies to fall on the recording medium.

More specifically, the present invention is directed to hot melt acoustic ink compositions wherein there can be generated with such inks excellent images with acceptable image permanence, excellent projection efficiency on transparencies with, for example, raised wax bump matte type images without a post fusing step, or without a post pressure treatment to flatten the bumps, and excellent crease resistance, and wherein the inks possess acceptable, and in certain embodiments superior lightfastness, and superior waterfastness. Moreover, in embodiments of the present invention there is enabled low MFLEN (mean frequency line edge noise), or edge acuity, for example a MFLEN of less than about 3, and more specifically, from about 0.5 to about 2.8, low intercolor bleed (ICB) of less than about 10, and more specifically, from 1 to about 5, and the elimination, or minimization of undesirable paper curl since water is not present, or very small amounts thereof are selected, in the invention inks, and in this regard it is preferred that there be an absence of water, and since water is not present in the inks a dryer can be avoided thereby minimizing the cost of the acoustic ink jet apparatus and process. The inks of the present invention in embodiments thereof are comprised of a copolymer vehicle, and more specifically, a triblock copolymer including, for example, certain physically crosslinked and physically branched networks, and wherein the networks can form a tough extended structure at room temperature, for example from about 20° C. to about 30° C. and preferably about 25° C., and wherein on heating the extended structure to the jetting temperature the physical crosslinks, or the physical branch points break to provide dissociated low molecular weight chains with low viscosity suitable for jetting. The aforementioned physical crosslinks, or physical branch points can be formed by association of endgroups of diblock and triblock copolymers wherein association is by hydrophobic bonds, hydrogen bonds, other known physical association mechanisms, and the like. With acoustic ink printing, it is desirable that the printheads be operable, for example, at a maximum temperature of about 160° C., and the jettability/throughput requirements may limit the viscosity of the ink to for example about 10 centipoise (centipoise) at the about 160° C. jetting temperature and these and other needs are achievable with the inks, and processes of the present invention in embodiments thereof.

Ink jet printing systems generally are of two major types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or to a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems, which use piezoelectric devices to expel the droplets, also suffer the disadvantage of a slow printing speed.

The other type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system is initiated with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink, in excess of the normal boiling point, diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction toward a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

Ink jet printing processes may also employ inks that are solid at room temperature and liquid at elevated temperatures. For example, U.S. Pat. No. 4,490,731, the disclosure of which is totally incorporated herein by reference, discloses an apparatus for dispensing certain solid inks for printing on a substrate such as paper. The ink dye vehicle is selected to have a melting point above room temperature so that the ink, which is melted in the apparatus, will not be subject to evaporation or spillage during periods of nonprinting. The vehicle is also chosen to have a low critical temperature to permit the use of the solid ink in a thermal ink jet printer. In thermal ink jet printing processes employing hot melt inks, the solid ink is melted by a heater in the printing apparatus and utilized as a liquid in a manner similar to that of conventional thermal ink jet printing. Upon contact with the printing substrate, the molten ink solidifies rapidly, enabling the dye to remain on the surface instead of being carried into the paper by capillary action, thereby attempting to enable higher print density than is generally obtained with liquid inks. Advantages of a hot melt ink in ink jet printing are the substantial elimination of potential spillage of the ink during handling, a wide range of print density and quality, minimal paper cockle or distortion, and enablement of indefinite periods of nonprinting without the danger of nozzle clogging, even without capping the nozzles. Hot melt ink jets are dissimilar than thermal ink jets described, however, a hot melt ink contains no solvent or water. Thus, rather than being liquid at room temperature, a hot melt ink is typically a solid or semi-solid having a wax-like consistency. These inks usually, thus as indicated herein, may need to be heated to approximately 100° C. before the ink melts and turns into a liquid. As with the thermal ink jet, a plurality of ink jet nozzles are provided in a printhead. A piezoelectric vibrating element is located in each ink channel upstream from a nozzle so that the piezoelectric oscillations propel ink through the nozzle. After the hot melt ink is applied to the substrate, the ink is resolidified by freezing on the substrate.

Each of these types of known ink jets, however, has a number of advantages and disadvantages. One advantage of thermal ink jets is their compact design for the integrated electronics section of the printhead. Thermal ink jets are disadvantageous in that the thermal ink has a tendency to soak into a plain paper medium. This blurs the print or thins out the print locally thereby adversely affecting print quality. Problems have been encountered with thermal ink jets in attempting to rid the ink of moisture fast enough so that the ink does not soak into a plain paper medium. This is particularly true when printing with color. Therefore, usually when printing with thermal ink, one needed to use coated papers, which are more expensive than plain paper.

One advantage of a hot melt ink jet is its ability to print on plain paper since the hot melt ink quickly solidifies as it cools and, since it is waxy in nature, does not normally soak into a paper medium. However, hot melt ink jets can be cumbersome in structure and in design. That is, the associated integrated electronics of a thermal ink jet head are considerably more compact than those of a hot melt ink jet head.

In addition, U.S. Pat. No. 4,751,528, the disclosure of which is totally incorporated herein by reference, discloses a hot melt ink jet system which includes a temperature-controlled platen provided with a heater and a thermoelectric cooler electrically connected to a heat pump and a temperature control unit for controlling the operation of the heater and the heat pump to maintain the platen temperature at a desired level. The apparatus also includes a second thermoelectric cooler to solidify hot melt ink in a selected zone more rapidly to avoid offset by a pinch roll coming in contact with the surface of the substrate to which hot melt ink has been applied. An airtight enclosure surrounding the platen is connected to a vacuum pump and has slits adjacent to the platen to hold the substrate in thermal contact with the platen.

Further, U.S. Pat. No. 4,791,439, the disclosure of which is totally incorporated herein by reference, discloses an apparatus for use with hot melt inks having an integrally connected ink jet head and reservoir system, the reservoir system including a highly efficient heat conducting plate inserted within an essentially non-heat conducting reservoir housing. The reservoir system has a sloping flow path between an inlet position and a sump from which ink is drawn to the head, and includes a plurality of vanes situated upon the plate for rapid heat transfer.

Ink compositions for ink jet printing are known. For example, U.S. Pat. No. 4,840,674, the disclosure of which is totally incorporated herein by reference, discloses an ink composition which comprises a major amount of water, an organic solvent selected from the group consisting of tetramethylene sulfone, 1,1,3,3-tetramethyl urea, 3-methyl sulfolane, and 1,3-dimethyl-2-imidazolidone, which solvent has permanently dissolved therein spirit soluble dyes.

U.S. Pat. No. 5,006,170 and U.S. Pat. No. 5,122,187, the disclosures of each of which are totally incorporated herein by reference, disclose hot melt ink compositions suitable for ink jet printing which comprise a colorant, a binder, and a propellant selected from the group consisting of hydrazine, cyclic amines, ureas, carboxylic acids, sulfonic acids, aldehydes, ketones, hydrocarbons, esters, phenols, amides, imides, halocarbons, urethanes, ethers, sulfones, sulfamides, sulfonamides, phosphites, phosphonates, phosphates, alkyl sulfides, alkyl acetates, and sulfur dioxide.

U.S. Pat. No. 5,021,802, the disclosure of which is totally incorporated herein by reference, discloses a bubble jet ink which comprises 90 to 99.9 percent by weight of aqueous sol-gel medium and 0.1 to 1 percent by weight of colorant. The inks are thermally reversible sol-gels which are gels at ambient temperatures and form liquid sols at temperatures between about 40 and 100° C.

U.S. Pat. No. 5,041,161, the disclosure of which is totally incorporated herein by reference, discloses an ink jet ink which is semi-solid at room temperature. The ink combines the advantageous properties of thermal phase change inks and liquid inks. The inks can comprise vehicles, such as glyceryl esters, polyoxyethylene esters, waxes, fatty acids, and mixtures thereof, which are semi-solid at temperatures between 20° C. and 45° C. The ink is impulse jetted at an elevated temperature in the range of above 45° C. to about 110° C., at which temperature the ink has a viscosity of about 10 to 15 centipoise.

U.S. Pat. No. 4,853,036 and U.S. Pat. No. 5,124,718 disclose an ink for ink jet recording which comprises a liquid composition essentially comprising a coloring matter, a volatile solvent having a vapor pressure of 1 millimeters Hg or more at 25° C., and a material being solid at room temperature and having a molecular weight of 300 or more, and prepared so as to satisfy the formula $B_1/A_1 \geq 3$, assuming viscosity as $A_1$ cP at 25° C., measured when the content of the solid material in the composition is 10 percent by weight, and assuming viscosity as $B_1$ cP at 25° C., measured when the content of the solid material in the composition is 30 percent by weight. An ink jet recording process using the ink is also disclosed.

U.S. Pat. No. 5,065,167, the disclosure of which is totally incorporated herein by reference, discloses an ink jet ink including a waxy carrier that is solid at 25° C. and liquid at the operating temperature of an ink jet nozzle and a driver having a critical pressure greater than 10 atmospheres, the carrier and driver being miscible in liquid phase.

U.S. Pat. No. 5,047,084, the disclosure of which is totally incorporated herein by reference, discloses an ink jet ink in the form of a microemulsion of an organic vehicle phase comprising fatty acid and colorant dispersed therein and an aqueous phase containing a surfactant, the vehicle phase preferably being liquid at 70° C. and solid at 20° C.

U.S. Pat. No. 5,226,957, the disclosure of which is totally incorporated herein by reference, discloses water insoluble dyes formulated in a microemulsion-based ink which is waterfast, non-threading, and bleed-alleviated. The inks comprise (a) about 0.05 to 0.75 weight percent of a high molecular weight colloid, (b) about 0.1 to 40 weight percent of at least two surfactants, comprising at least one surfactant and at least one co-surfactant, (c) about 0.5 to 20 weight percent of at least one cosolvent, (d) about 0.1 to 5 weight percent of at least one water insoluble dye, (e) about 0.1 to 20 weight percent of an oil, and (f) the balance water. The ink forms a stable microemulsion. "Stabilization of Inverse Micelles by Nonionic Surfactants," Stig E. Friberg, contained in *Interfacial Phenomena in Apolar Media,* Eicke & Parfitt, eds., Marcel Dekker Inc. (New York and Basel 1987), the disclosure of which is totally incorporated herein by reference, discloses and describes systems with hydrocarbon, water, and nonionic polyalkylene glycol alkyl ether surfactants which display pronounced variation of their phase patterns with temperature. At particular temperatures and component concentrations, a lamellar liquid crystalline phase is observed.

In acoustic ink printing, the print head produces, for example, approximately 2.2 picoliter droplets by an acoustic energy process. The ink under these conditions should display a melt viscosity of about 5 centipoise or less at the jetting temperature. Furthermore, once the ink is jetted onto the paper, the ink image should be of excellent crease property, non-smearing, waterfast, of excellent transparency and fix qualities. In selecting an ink for such applications, it is desirable that the vehicle display low melt viscosity, such as from about 1 centipoise to about 20 centipoise in the acoustic head, while displaying solid like properties after being jetted onto paper. Since the acoustic head can tolerate a temperature up to about 180° C., and preferably up to a temperature of from about 140° C. to about 160° C., the vehicle should display liquid like properties such as a viscosity of 1 to about 20 centipoise at a temperature of from about 125° C. to about 165° C., and solidify or harden after jetting onto paper such that the ink displays a hardness value of from about less than 0.1 to 2.0 millimeters utilizing a penetrometer according to the ASTM penetration method D1321. The hot melt inks of this invention with the triblock copolymer structure have advantages over the prior art hot melt inks, such as those with ester modified waxes (U.S. Pat. No. 4,851,045), polyoxyethylene esters (U.S. Pat. No. 5,041,161), benzene sulfonamide (U.S. Pat. No. 5,230,731), mono amides (U.S. Pat. No. 4,889,560) and polyethylene waxes (U.S. Pat. No. 5,185,035), which advantages include the use of a triblock structure for the ink vehicle, and which inks display a viscosity of from about 1 to about 20 centipoise when heated to a temperature of from about 125° C. to 180° C., such that the acoustic energy in the printhead can eject an ink droplet onto paper. For example, preferred triblock structures include JEFFAMINE D-400™ distearate, JEFFAMINE ED-600™ distearate and JEFFAMINE ED-900™ distearate. The viscosities of these materials at 160° C. are 6, 8, and 10 centipoise, respectively. Another advantage of these vehicles is that they have a high hardness or low penetration value, and thereby enable excellent image permanence. For example, the penetration/hardness value of the JEFFAMINE D-400™ distearate is 0.8 millimeter.

Curable inks are known, for example, U.S. Pat. No. 4,680,368 discloses an ultraviolet curable ink composition comprising a polyurethane polymethacrylate obtained by reacting a polyisocyanate compound of the formula

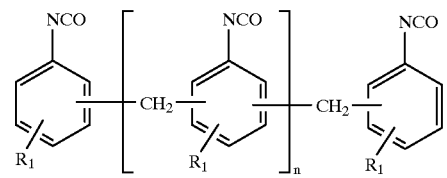

wherein $R_1$ is a hydrogen atom or a methyl group, and n is an integer of from 1 to 20, with a hydroxyl group containing methacrylate and having in one molecule at least two methacryloyl groups and at least two urethane bonds, a radical polymerizable low molecular weight compound, and a photopolymerization initiator. In addition, U.S. Pat. No. 4,443,495 discloses a heat curable conductive ink that comprises (1) an ethylenically unsaturated member of the group consisting of (a) a liquid ethylenically unsaturated monomer or oligomer of the formula

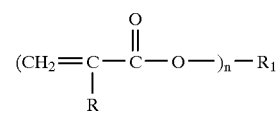

wherein R is H or $CH_3$, $R_1$ is an organic moiety and n is at least 2, (b) a polythiol in combination with (a), (c) a polythiol in combination with a liquid ethylenically unsaturated monomer or oligomer of the formula

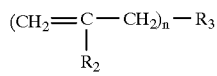

wherein $R_2$ is H or $CH_3$, $R_3$ is an organic moiety and n is at least 2, and (d) mixtures of (a), (b), and (c); (2) a thermal initiator; and (3) an electrically conductive material. Heating of the composition in a desired pattern on a substrate results in a printed electric circuit.

Microemulsion ink compositions are illustrated in U.S. Pat. No. 5,492,559, the disclosure of which is totally incorporated herein by reference.

Disclosed in U.S. Pat. Nos. 5,688,312; 5,667,568; 5,700,316 and 5,747,554, the disclosures of each being totally incorporated herein by reference are acoustic ink jet inks and processes thereof.

While known compositions and processes are suitable for their intended purposes, a need remains for acoustic hot melt ink compositions suitable for acoustic ink jet printing. In addition, there is a need for hot melt ink compositions which are compatible with a wide variety of plain papers. Further, there is a need for hot melt ink compositions which generate high quality, waterfast images on plain papers. There is also a need for hot melt ink jet ink compositions which generate high quality, fast-drying images on a wide variety of plain papers at low cost, with high quality text and high quality graphics. Further, there is a need for hot melt ink jet ink compositions which exhibit minimal feathering. Additionally, there is a need for hot melt ink jet ink compositions which exhibit minimal intercolor bleed. There is also a need for hot melt ink jet ink compositions which exhibit excellent image permanence. Further, there is a need for hot melt ink jet ink compositions which are suitable for use in acoustic ink jet printing processes. Additionally, there is a need for hot ink compositions suitable for ink jet printing processes wherein the substrate is heated prior to printing and is cooled to ambient temperature subsequent to printing (also known as heat and delay printing processes). There is also a need for ink compositions suitable for ink jet printing wherein high optical densities can be achieved with relatively low dye concentrations. A need also remains for ink compositions suitable for ink jet printing wherein curling of the substrate subsequent to printing is minimized, or avoided.

SUMMARY OF THE INVENTION

Examples of object of the present invention include for example:

It is an object of the present invention to provide hot melt ink jet ink compositions with many of the advantages illustrated herein.

Another object of the present invention relates to acoustic inks that possess a desirable viscosity of from about 1 to about 20 centipoise when heated to a temperature of from about 125° C. to 180° C.

In yet another object of the present invention there are provided inks with a high hardness or low penetration value, of importance with respect to excellent image permanence.

Another object of the present invention is to provide hot melt ink jet ink compositions which are comprised of a colorant and vehicle comprised of a triblock copolymer.

Yet another object of the present invention is to provide hot melt ink jet ink compositions which exhibit a low viscosity of from about 1 to about 10 centipoise at a temperature of from about 125° C. to 180° C.

It is another object of the present invention to provide hot melt ink jet ink compositions suitable for acoustic ink jet printing.

It is yet another object of the present invention to provide hot melt ink jet ink compositions which are compatible with a wide variety of plain papers.

It is still another object of the present invention to provide hot melt ink jet ink compositions which generate high quality, waterfast images on plain papers.

Another object of the present invention is to provide hot melt ink jet ink compositions which generate high quality, fast-drying images on a wide variety of plain papers at low cost with high quality text and high quality graphics.

Yet another object of the present invention is to provide hot melt ink jet ink compositions which exhibit minimal feathering.

Still another object of the present invention is to provide hot melt ink jet ink compositions which exhibit minimal intercolor bleed.

It is another object of the present invention to provide hot melt ink jet ink compositions which exhibit excellent image permanence.

It is yet another object of the present invention to provide hot melt ink jet ink compositions that contain no water or solvent, and which are suitable for use in acoustic ink jet printing processes.

It is still another object of the present invention to provide hot melt ink jet ink compositions that contain no water, and that are suitable for ink jet printing processes wherein the substrate is heated prior to printing and is cooled to ambient temperature subsequent to printing (also known as heat and delay printing processes).

Another object of the present invention is to provide ink compositions suitable for ink jet printing wherein high optical densities can be achieved with relatively low dye concentrations.

Yet another object of the present invention is to provide water free hot melt ink compositions suitable for ink jet printing wherein curling of the substrate subsequent to printing is minimized.

Moreover, in another object of the present invention there are provided ink compositions which are environmentally friendly.

Another object of the present invention resides in the provision of hot melt inks wherein the viscosity of the ink is from about 1 centipoise to about 10 centipoise at the jetting temperature which can be, for example, from about 125° C. to about 180° C., and preferably about 160° C., thereby enabling excellent jetting at reasonable power levels.

Further, in another object of the present invention there are provided hot melt inks with no water and vehicles, such as alkane-polyethylene oxide(PEO)-alkane, and alkane-(polypropylene oxide (PPO)-PEO-PPO)-alkanes, and more specifically, polyethylene glycol (PEG) distearates and JEFFAMINE™ distearates, and more generally, certain triblock type polymers.

Additionally, in another object of the present invention there are provided hot melt inks with no water for ink printing methods and apparatuses, and wherein a number of the advantages as illustrated herein are achievable.

These and other objects of the present invention are accomplished in embodiments by the provision of an ink composition comprised of a triblock copolymer and a dye or pigment; and an ink composition comprised of a triblock polymer vehicle, a dye or pigment, and optional ink additives.

BRIEF DESCRIPTION OF THE DRAWINGS

FIG. 1 (b) shows the components of the network of FIG. 1 (a) which have been broken into low viscosity material. FIG. 1 (c) shows a physically branched network made up of A-B-A type triblock structures. FIG. 1 (d) shows the broken branches of the A-B-A type branched structure. The broken branches primarily provide for low viscosity at high temperature.

Figure 1A:
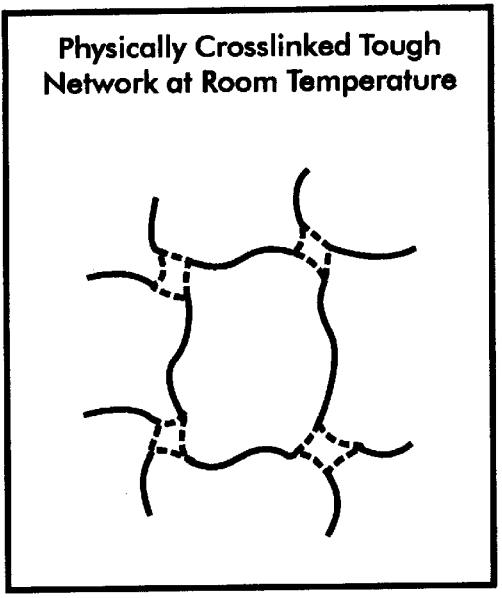
FIG. 1 illustrates schematically the crosslinked and branched structures that are proposed for the inks of the present invention in embodiments thereof, and wherein the crosslinked networks in FIG. 1 (a) are formed of triblock A-B-A type components.
Figure 1B:
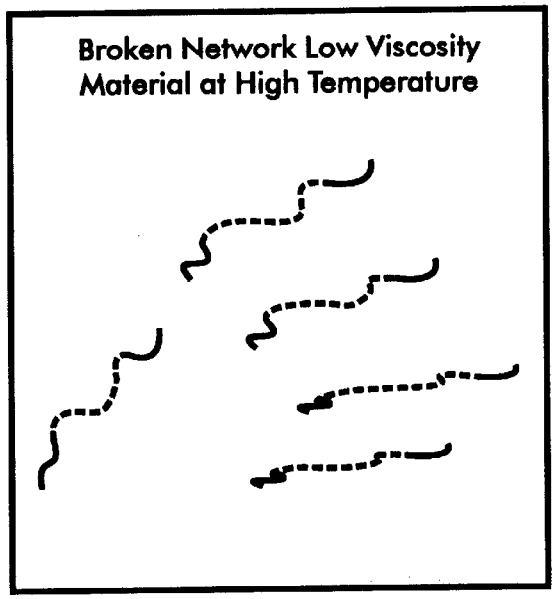
Figure 1C:
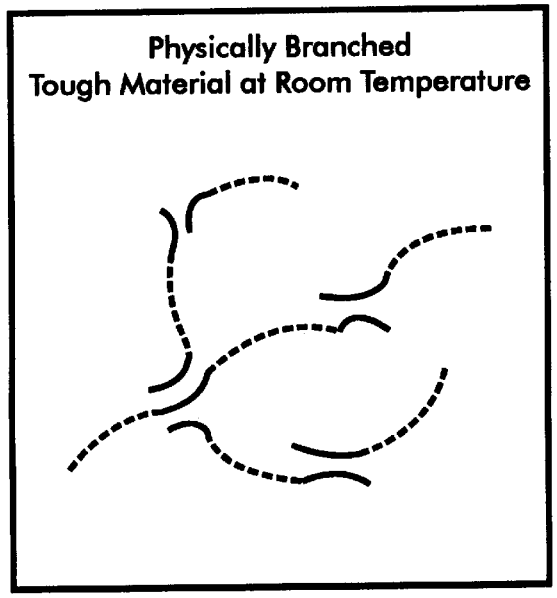
Figure 1D:
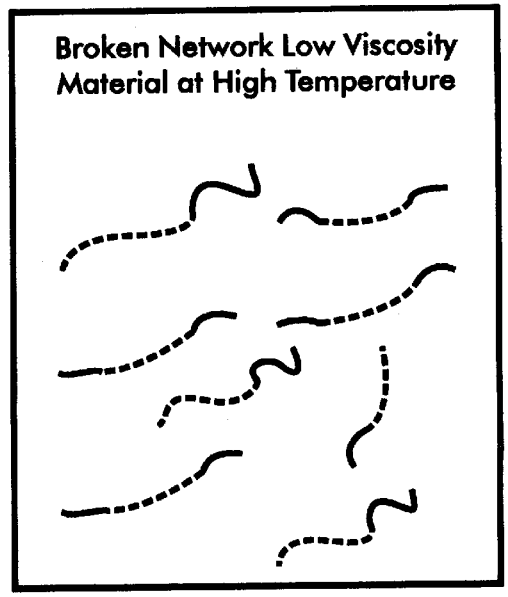

The total molecular weight $M_w$ of the invention A-B-A triblock vehicles should be in embodiments between about 500 to 2,500 primarily to satisfy the viscosity requirements, that is a viscosity of between 1 centipoise and 20 centipoise at the jetting temperature of between 120° C. and 180° C. Preferably the viscosity should be between 1 centipoise and 5 centipoise at the jetting temperature of between 140° C. and 165° C. Low molecular weight materials of this type (A-B-A triblock) should be very nearly monodisperse and, therefore, nearly the same ranges should apply to $M_n$. Therefore, $M_n$ for the triblock copolymer vehicle in embodiments is between about 450 and about 2,200. The A-B components should have a large difference in solubility parameters in order to produce the ordered network shown in FIG. 1 with such low molecular weight materials. Examples of specific triblock copolymer ink vehicles and reaction schemes thereof include

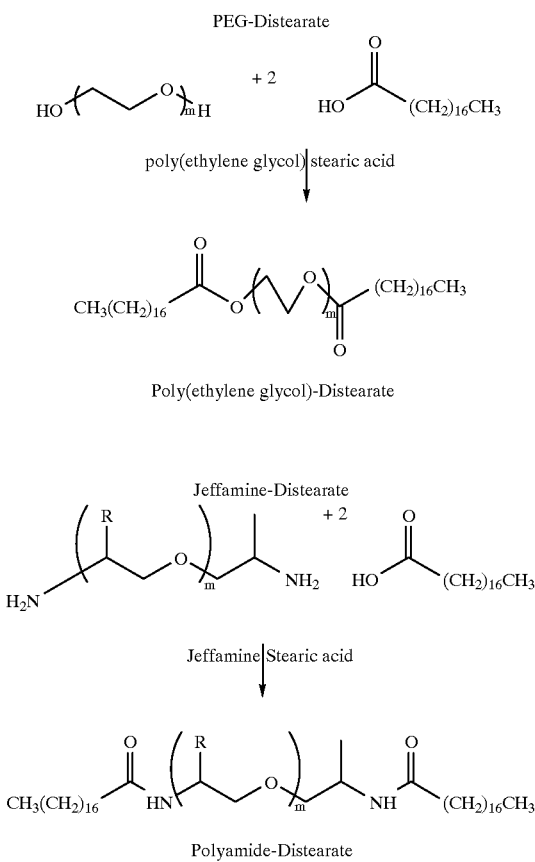

polyoxyethylene-polydimethylsiloxane, polyoxyethylene-polyethylene, and polymethylacrylate-polydimethylsiloxane.

DETAILED DESCRIPTION OF THE INVENTION

In embodiments, the ink compositions of the present invention comprise a dye or pigment, and a triblock copolymer vehicle, and wherein the dye or pigment is present in various effective amounts, such as from about 0.1 to about 40 weight percent, and the triblock copolymer is present in an amount of from about 60 to about 99 weight percent.

Examples of triblock copolymers of the present invention include those of the formulas illustrated herein such as alkane-polyoxyethylene-alkane, alkane-polyoxyproplyene-alkane,alkane-(PPO)-(PEO)-(PPO)-alkane, such as poly (ethylene glycol)-distearate, JEFFAMINE-distearate, or polyamide-distearate.

The alkane-(PEO)-alkane vehicle can be prepared by reacting an organic acid with a poly(ethylene oxide) compound by a condensation process. In one embodiment, the alkane-(PEO)-alkane is prepared, for example, by charging a reactor, such as a one liter Parr reactor equipped with a distillation apparatus, with from about 1 mole equivalent of an organo-acid, such as stearic acid, with about 0.5 mole equivalent of a poly(ethylene oxide) and optionally a condensation catalyst, such as dibutylstannoic acid, at a temperature of from about 150° C. to about 185° C. with stirring for a duration of from about 3 to about 6 hours. During this time, water is collected as byproduct in the distillation receiver. The reaction mixture is then poured into a pan and allowed to cool to room temperature.

Similarly, the alkane-(PPO)-(PEO)-(PPO)-alkane vehicle utilized in the present invention for generating the ink can be prepared by reacting an organic acid with a poly(PO-EO-PO) compound by a condensation process. The two components are used in a molar ratio of 2:1 of organic acid to poly(PO-EO-PO). In one embodiment, the alkane-(PPO)-(PEO)-(PPO)-alkane is prepared, for example, by charging a reactor, such as a one liter Parr reactor equipped with a distillation apparatus, with from about 1 mole equivalent of an organo acid, such as stearic acid, with about 0.5 mole equivalent of a poly(PO-EO-PO), such as JEFFAMINE D-400™, and optionally a condensation catalyst, such as dibutylstannoic acid, at a temperature of from about 150° C. to about 185° C. with stirring for a duration of from about 3 to about 6 hours. During this time, water is collected as byproduct in the distillation receiver. The reaction mixture is then poured into a pan and allowed to cool to room temperature.

The organic acids, which are selected in various effective amounts as illustrated herein, such as 2:1 molar ratio utilized in the preparation of the triblock copolymer, can be selected from the group consisting of formic acid, acetic acid, propionic acid, butyric acid, valeric acid, hexanoic acid, heptanoic acid, octanoic acid, decanoic acid, undecanoic acid, dodecanoic acid, tridecanoic acid, myristic acid, pentadecanoic acid, palmitic acid, heptadecanoic acid, stearic acid, nonadecanoic acid, eicosanoic acid, heneicosanoic acid, docosanoic acid, and the like.

The poly(oxyethylene) compound reactants can have a range of molecular weights of from about 200 to 1,500.

The poly(oxypropylene) and poly(PO-EO-PO) materials were selected from a series of JEFFAMINE™ materials produced by and available from Texaco.

The ink rheological characterization was accomplished on a Carri-Med CSL 100 controlled stress rheometer with a cone and plate geometry and a 4 centimeters, 2° cone. The gap was maintained at 100 microns. The tests were based on shear rate sweeps to the maximum rate of 1250 s$^{-1}$ at temperatures of 100° C. to 180° C. in 20° C. increments. The procedure included a preshear period of 10 seconds and an equilibration time of 10 seconds. The ascent and descent periods were 2 minutes each with a holding time in between of 30 seconds at the maximum rate. Most of, for example, the alkane-(PPO)-(PEO)-(PPO)-alkane materials were newtonian, that is, the viscosity remains constant, independent of the shear rate. The infinite shear viscosity was then plotted as a function of temperature to generate the data.

The colorant for the ink compositions of the present invention is a dye or a mixture of one or more dyes or a pigment, a mixture of one or more pigments or a mixture of one or more dyes with one or more pigments. The pigment can be black, cyan, magenta, yellow, red, blue, green, brown, mixtures thereof, and the like, and for black is preferably carbon black. Examples of suitable black pigments include various carbon blacks such as channel black, furnace black, lamp black, and the like. Colored pigments include red, green, blue, brown, magenta, cyan, and yellow particles, as well as mixtures thereof. Illustrative examples of magenta pigments include 2,9-dimethyl-substituted quinacridone and anthraquinone, identified in the Color Index as CI 60710, CI Solvent Red 19, and the like. Illustrative examples of suitable cyan pigments include copper tetra-4-(octadecyl sulfonamido) phthalocyanine, X-copper phthalocyanine pigment, listed in the Color Index as CI 74160, CI Pigment Blue, and Anthradanthrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Permanent Yellow FGL, and the like. Additional examples of pigments and solvent dyes include Normandy Magenta RD-2400 (Paul Uhlich), Paliogen Violet 5100 (BASF) as CI Pigment Violet 19, Paliogen Violet 5890 (BASF), Permanent Violet VT2645 (Paul Uhlich), Heliogen Green L8730 (BASF) as CI Pigment Green 7, Argyle Green XP-111-S (Paul Uhlich), Brilliant Green Toner GR 0991 (Paul Uhlich) as Pigment Green 1, Heliogen Blue L6900 as CI Pigment Blue 15:1, L7020 (BASF) as CI Pigment Blue 15:3, Heliogen Blue D6840 as CI Pigment Blue 15, D7080 (BASF) as CI Pigment Blue 15:3, Sudan Blue OS (BASF), PV Fast Blue B2G01 (American Hoechst) as CI Pigment Blue 15:3, Irgalite Blue BCA (Ciba-Geigy), Paliogen Blue 6470 (BASF) as CI Pigment Blue 60, Sudan III (Matheson, Coleman, Bell) as CI Solvent Red 23, Sudan II (Matheson, Coleman, Bell) as Solvent Red 7, Sudan IV (Matheson, Coleman, Bell) as Solvent Red 24, Sudan Orange G (Aldrich), Sudan Orange 220 (BASF), Paliogen Orange 3040 (BASF) as CI Pigment Orange 52, Ortho Orange OR 2673 (Paul Uhlich) as CI Pigment Orange 2, Paliogen Yellow 152, 1560 (BASF) as Pigment Yellow 108, Lithol Fast Yellow 0991K (BASF), Paliotol Yellow 1840 (BASF), Novoperm Yellow FG1 (Hoechst), Permanent Yellow YE 0305 (Paul Uhlich), Lumogen Yellow D0790 (BASF), Sico-Gelb L1250 (BASF), Sico-Yellow D1357 (BASF) as CI Pigment Yellow 13, Hostaperm Pink E (American Hoechst), Fanal Pink D4830 (BASF) as CI Pigment Red 51, Cinquasia Magenta (DuPont), Lithol Scarlet D3700 (BASF) as CI Pigment Red 48:1, Toluidine Red (Aldrich) as CI Pigment Red 3, Scarlet for Thermoplast NSD PS PA (Ugine Kuhlmann of Canada), E. D. Toluidine Red (Aldrich), Lithol Rubine Toner (Paul Uhlich) as CI Pigment Red 57:1, Lithol Scarlet 4460 (BASF) as CI Pigment Red 48:2, Bon Red C (Dominion Color Co.), Royal Brilliant Red RD-8192 (Paul Uhlich), Oracet Pink RF (Ciba-Geigy), Paliogen Red 3871K (BASF) as CI Pigment Red 123, Paliogen Red 3340 (BASF) as CI Pigment Red 226, and Lithol Fast Scarlet L4300 (BASF) as CI Pigment Red 48:4. Preferred pigments are CI Pigment Red 51, CI Pigment Red 57, CI Pigment Red 81, CI Pigment Red 169, CI Pigment Yellow 17, CI Pigment Yellow 14, CI Pigment Yellow 13, CI Pigment Blue 15, CI Pigment Blue 60, and CI Solvent Blue 70.

Examples of dyes selected for the inks of the present invention are known and include, for example, Resorcin Crystal Violet, Orasol Black RL or Intraplast Black RL/Solvent Black 29, Lapranol Black BR, Savinyl Black RLS, Orasol Black RLP, Neozapon Black X57; solvent yellow dyes inclusive of Savinyl Yellow 2 RLS, Savinyl Yellow RLSN, Intraplast Yellow 2GLN, Neozapon Yellow 081, Neozapon Yellow 141, Levaderm Lemon Yellow, Zapon Fast Yellow CGR, Aizen Fast Yellow CGNH, Zapon Yellow 100, Zapon Yellow 157, and Savinyl Yellow RLS; magenta dyes such as Neozapon Red 492, Direct Brilliant Pink B, Savinyl Pink 6 BLS, Savinyl Red 3 BLS, Orasol Red 2 BL, Intraplast Red G (Orasol Red), Savinyl Red BLSN, Savinyl Scarlet RLS, Savinyl Fire Red 3GLS, and Zapon Red 335; cyan dyes Orasol Blue 2 GLN, Neozapon Blue 807, Savinyl Blue RLS, Savinyl Blue GLS, Orasol Blue GN, and Losol Blue; brown dyes inclusive of Zapon Brown 187 and Savinyl Brown GLS, Solvent Green 3, Sudan Black B, Ceres Blue 2V, Liquid Oil Jet Black, Macrolex Red G Gram, Macrolex Yellow 3G, RBX3LV dye available from Milliken Chemical, Victoria Blue R, available from Bayer AG, Leverkusen, Germany, Morfast Blue 100, Morfast Red 104, and Morfast Red 100, available from Morton International Specialty Chemicals Group, Chicago, Ill.; and mixtures thereof; and the like. Typically, the dye and/or pigment is present in the ink in an amount of from about 0.01 to about 20 percent by weight, preferably from about 0.05 to about 5 percent by weight, and more preferably from about 0.1 to about 3 percent by weight, although the amount can be outside these ranges.

Optional ink additives include antioxidants such as hindered phenol compounds, arylamine compounds, phosphite compounds, mercapto-benzimidazoles, hydroquinones, butylated paracresol, amines, unsaturated acetals, and other known additives. Specifically, antioxidants, such as Naugard 542 obtained from Uniroyal Chemical, Irganox 1010 obtained from Ciba-Geigy Corporation additives Division, and Ultranox 236 or Ultranox 626 obtained from General Electric Specialty Chemical, can be selected. The antioxidants are present in an amount of from 0 to about 2 percent by weight and preferably from about 0.01 to about 1 percent by weight.

Inks of the present invention can be prepared by any suitable method. For example, the inks can be prepared by melt mixing the vehicle comprised of the triblock copolymer with a colorant and other optional suitable ink additives, such as the antioxidants, at a temperature of from about 90° C. to about 130° C., followed by cooling to about 25° C. To ensure more complete mixing, an attritor may be used to melt mix the ink components.

Printed images may be generated with the inks of the present invention by incorporating the inks into an ink jet printer and causing droplets of the ink to be ejected in imagewise pattern onto a substrate such as paper or transparency material. Suitable printers for employing the inks of the present invention include commercially available ink jet printers, such as the Tektronix Phaser 340 printer. Conventional piezoelectric hot melt ink jet printers are suitable for use with inks of the present invention. The inks can also be employed in processes wherein the ink is jetted onto an intermediate, followed by transfer of the image from the intermediate to a substrate. The inks of the present invention are also suitable for use in piezoelectric drop-on-demand ink jet printing systems and in continuous stream ink jet printing systems. Any suitable substrate can be employed, including plain papers, such as Xerox 4024 papers, ruled notebook paper, bond paper, silica coated papers, such as Sharp Company silica coated paper, Jujo paper, and the like, transparency materials, fabrics, textile products, plastics, polymeric films, inorganic substrates, such as metals and wood, and the like. In a preferred embodiment, the process entails printing onto a porous or ink absorbent substrate, such as plain paper.

The inks of the present invention are particularly suitable for use in acoustic ink jet printing processes. In acoustic ink jet printing, an acoustic beam exerts a radiation pressure against objects upon which it impinges. Thus, when an acoustic beam impinges on a free surface of the ink of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. These principles have been applied to ink jet and acoustic printing proposals. For example, K. A. Krause, "Focusing Ink Jet Head," *IBM Technical Disclosure Bulletin,* Vol 16, No. 4, September 1973, pp. 1168–1170, the disclosure of which is totally incorporated herein by reference, describes an ink jet in which an acoustic beam emanating from a concave surface and confined by a conical aperture was used to propel ink droplets out through a small ejection orifice.

Acoustic ink printers typically comprise one or more acoustic radiators for illuminating the free surface of a pool of liquid ink with respective acoustic beams. Each of these beams usually is brought to focus at or near the surface of the reservoir (that is, the liquid/air interface). Furthermore, printing conventionally is performed by independently modulating the excitation of the acoustic radiators in accordance with the input data samples for the image that is to be printed. This modulation enables the radiation pressure, which each of the beams exerts against the free ink surface, to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam.

Acoustic ink printing is attractive since, for example, such processes do not require the nozzles or the small ejection orifices which have caused many of the reliability and pixel placement accuracy problems that conventional drop on demand and continuous stream ink jet printers have suffered. The size of the ejection orifice is a critical design parameter of an ink jet because it determines the size of the droplets of ink that the jet ejects. As a result, the size of the ejection orifice cannot be increased without sacrificing resolution. Acoustic printing has increased intrinsic reliability because there are no nozzles to clog. The elimination of the clogged nozzle failure mode is especially relevant to the reliability of large arrays of ink ejectors, such as page width arrays comprising several thousand separate ejectors. Furthermore, small ejection orifices are avoided, so acoustic printing can be performed with a greater variety of inks than conventional ink jet printing, including inks having higher viscosities and inks containing pigments and other particulate components.

It has been found that acoustic ink printers embodying printheads comprising acoustically illuminated spherical focusing lenses can print precisely positioned pixels (i.e., picture elements) at resolutions which are sufficient for high quality printing of relatively complex images. It has also been discovered that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of pagewidth ejector arrays, ranging from (i) single row, sparse arrays for hybrid forms of parallel/serial printing to (ii) multiple row staggered arrays with individual ejectors for each of the pixel positions or addresses within a page-width image field (i.e., single ejector/pixel/line) for ordinary line printing.

Inks suitable for acoustic ink jet printing typically are liquid at ambient temperatures (i.e., about 25° C.), however, the ink is in a solid state at ambient temperatures, and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in *J. Appl. Phys.,* vol. 65, no. 9 (May 1, 1989) and references therein, the disclosure of which is totally incorporated herein by reference.

Specific embodiments of the invention will now be described in detail. These Examples are intended to be illustrative, and the invention is not limited to the materials, conditions, or process parameters set forth in these embodiments. All parts and percentages are by weight unless otherwise indicated.

EXAMPLE I

Synthesis of poly(ethylene glycol)-distearate of a molecular weight $M_w$ of 1,130 grams per mole was prepared from stearic acid and poly(ethylene glycol) of a molecular weight of 600.

A 1 liter Parr reactor equipped with a mechanical stirrer and a distillation apparatus was charged with 284 grams of stearic acid, 300 grams of PEG poly(ethylene glycol) of a molecular weight $M_w$ of 600, and 0.5 gram of butyl stannoic acid available as Fascat 4100 from ALF-Atochem. The mixture was then heated to 165° C. over a 2 hour period, followed by increasing the temperature to 195° C. for a duration of 6 hours. The pressure was then reduced from atmospheric pressure to about 1 millimeter Hg, and these conditions were maintained for an additional hour, wherein the total amount of water collected in the distillation receiver during the process was measured to be about 15 milliliters. The pressure was then increased to atmospheric pressure and the product, a viscous liquid, was poured into a metal container and left undisturbed to cool down to room temperature, about 25° C.

EXAMPLE II

Synthesis of poly(ethylene glycol)-distearate of a molecular $M_w$ weight of 1,530 grams per mole was prepared from stearic acid and poly(ethylene glycol) of a molecular weight of 1,000.

A 1 liter Parr reactor equipped with a mechanical stirrer and a distillation apparatus was charged with 284 grams of stearic acid, 300 grams of PEG of a molecular weight of 1,000, and 0.5 gram of butyl stannoic acid available as Fascat 4100 from ALF-Atochem. The mixture was then heated to 165° C. over a 2 hour period, followed by increasing the temperature to 195° C. for a duration of 6 hours. The pressure was then reduced from atmospheric pressure to about 1 millimeter Hg, and these conditions were maintained for an additional hour, wherein the total amount of water collected in the distillation receiver during the process was measured to be about 15 milliliters. The pressure was then increased to atmospheric pressure and the product, a viscous liquid, was poured into a metal container and left undisturbed to cool down to room temperature.

EXAMPLE III

Synthesis of JEFFAMINE-distearate of a molecular weight $M_w$ of 720 grams per mole was prepared from stearic acid and JEFFAMINE EDR-192™ a tetraethylene glycol diamine.

A 300 milliliter Parr reactor equipped with a mechanical stirrer and a distillation apparatus was charged with 148 grams of stearic acid, and 50 grams of JEFFAMINE EDR-192™ from Texaco Chemical Company. The mixture was then heated to 165° C. over a 2 hour period, followed by increasing the temperature to 180° C. for a duration of 4 hours. The pressure was then reduced from atmospheric pressure to about 1 millimeter Hg, and these conditions were maintained for an additional hour, wherein the total amount of water collected in the distillation receiver during the process was measured to be about 15 milliliters. The pressure was then increased to atmospheric pressure and the product, a viscous liquid, was poured into a metal container and left undisturbed to cool down to room temperature.

EXAMPLE IV

Synthesis of JEFFAMINE-distearate of a molecular weight of $M_w$ 760 grams per mole was prepared from stearic acid and JEFFAMINE D-230™, a poly(propylene glycol) bis(2-aminopropyl ether) of molecular weight 230.

A 1 liter Parr reactor equipped with a mechanical stirrer and a distillation apparatus was charged with 284 grams of stearic acid, 115 grams of JEFFAMINE D-230™ from Texaco Chemical Company, and 0.5 gram of butyl stannoic acid available as Fascat 4100 from ALF-Atochem. The mixture was then heated to 165° C. over a 2 hour period, followed by increasing the temperature to 180° C. for a duration of 4 hours. The pressure was then reduced from atmospheric pressure to about 1 millimeter Hg, and these conditions were maintained for an additional hour, wherein the total amount of water collected in the distillation receiver during the process was measured to be about 15 milliliters. The pressure was then increased to atmospheric pressure and the product, a viscous liquid, was poured into a metal container and left undisturbed to cool down to room temperature.

EXAMPLE V

Synthesis of JEFFAMINE-distearate of a molecular weight $M_w$ of 930 grams per mole was prepared from stearic acid and JEFFAMINE D-400™ a poly(propylene glycol) bis(2-aminopropyl ether) of molecular weight 400.

A 1 liter Parr reactor equipped with a mechanical stirrer and a distillation apparatus was charged with 284 grams of stearic acid, 200 grams of JEFFAMINE D-400™ from Texaco Chemical Company, and 0.5 gram of butyl stannoic acid available as Fascat 4100 from ALF-Atochem. The mixture was then heated to 165° C. over a 2 hour period, followed by increasing the temperature to 180° C. for a duration of 4 hours. The pressure was then reduced from atmospheric pressure to about 1 millimeter Hg, and these conditions were maintained for an additional hour, wherein the total amount of water collected in the distillation receiver during the process was measured to be about 15 milliliters. The pressure was then increased to atmospheric pressure and the product, a viscous liquid, was poured into a metal container and left undisturbed to cool down to room temperature.

EXAMPLE VI

Synthesis of JEFFAMINE-distearate of a molecular weight $M_w$ of 1,130 grams per mole was prepared from stearic acid and a poly(propylene glycol-b-ethylene glycol-b-propylene glycol) bis(2-aminopropyl ether) of molecular weight of 600.

A 1 liter Parr reactor equipped with a mechanical stirrer and a distillation apparatus was charged with 284 grams of stearic acid, 300 grams of JEFFAMINE ED-600™ from Texaco Chemical Company, and 0.5 gram of butyl stannoic acid available as Fascat 4100 from ALF-Atochem. The mixture was then heated to 165° C. over a 2 hour period, followed by increasing the temperature to 180° C. for a duration of 4 hours. The pressure was then reduced from atmospheric pressure to about 1 millimeter Hg, and these conditions were maintained for an additional hour, wherein the total amount of water collected in the distillation receiver during the process was measured to be about 15 milliliters. The pressure was then increased to atmospheric pressure and the product, a viscous liquid, was poured into a metal container and left undisturbed to cool down to room temperature.

EXAMPLE VII

Synthesis of JEFFAMINE-distearate of a $M_w$ molecular weight of 1,430 grams per mole was prepared from stearic acid and a poly(propylene glycol-b-ethylene glycol-b-propylene glycol) bis(2-aminopropyl ether) of molecular weight of 900.

A 1 liter Parr reactor equipped with a mechanical stirrer and a distillation apparatus was charged with 189 grams of stearic acid, 300 grams of JEFFAMINE ED-900™ from Texaco Chemical Company, and 0.5 gram of butyl stannoic acid available as Fascat 4100 from ALF-Atochem. The mixture was then heated to 165° C. over a 2 hour period, followed by increasing the temperature to 180° C. for a duration of 4 hours. The pressure was then reduced from atmospheric pressure to about 1 millimeter Hg, and these conditions were maintained for an additional hour, wherein the total amount of water collected in the distillation receiver during the process was measured to be about 15 milliliters. The pressure was then increased to atmospheric pressure and the product, a viscous liquid, was poured into a metal container and left undisturbed to cool down to room temperature.

The products obtained in the above Examples were identified by NMR Spectroscopy and FTIR Spectroscopy, the reactants used, and the polycondensation reaction conditions.

EXAMPLE VIII to XIV

A series of blue inks were then formulated by melt mixing 5 percent by weight of RBX3LV dye available from Milliken Chemicals with 95 percent by weight of the selected vehicles (Table 1) at 140° C. for 5 minutes, followed by cooling to room temperature. The rheological characterization, and more specifically, viscosity was performed using the Carri-Med CSL-100 controlled stress rheometer using a 4 centimeter, 2 degree cone, and plate geometry.

TABLE 1

| EXAMPLE | VEHICLE | VISCOSITY (cp) of vehicle at 160° C. |
|---|---|---|
| Example VIII | PEG 600 Distearate | 6.0 |
| Example IX | PEG 1000 Distearate | 8.1 |
| Example X | Jeffamine EDR-192 Distearate | 7.0 |
| Example XI | Jeffamine D-230 Distearate | 7.0 |
| Example XII | Jeffamine D-400 Distearate | 7.1 |
| Example XIII | Jeffamine ED-600 Distearate | 8.4 |
| Example XIV | Jeffamine ED-900 Distearate | 9.7 |

The ink compositions were each incorporated into an acoustic ink jet printing test fixture utilizing the ejection mechanism disclosed in *J. Appl. Phys.* 65 (9), May 1, 1989, and references therein, the disclosure of which is totally incorporated herein by reference. A jetting frequency of 160 MHz were used to generate drops of about 2 picoliters, up to 12 drops per pixel at 600 spi. The images thus formed exhibited excellent quality, high definition, sharp edges, and waterfastness. MFLEN values were typically ≦3 μm and waterfastness was 100 percent.

Other similar hot melt inks not specifically disclosed herein, or variations thereof are included within the scope of the present invention in embodiments thereof.

Other embodiments and modifications of the present invention may occur to those skilled in the art subsequent to a review of the information presented herein, these embodiments and modifications, as well as equivalents thereof, are also included within the scope of this invention.

What is claimed is:

1. A hot melt ink composition consisting essentially of a triblock copolymer vehicle, and a dye or pigment, and wherein the triblock copolymer is of the following alternative formulas

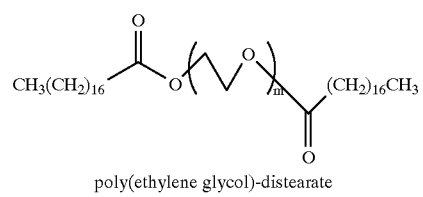

poly(ethylene glycol)-distearate

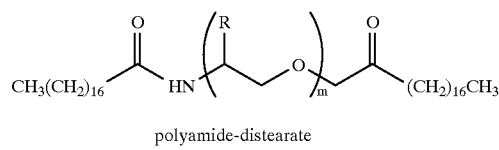

polyamide-distearate

2. A hot melt ink composition consisting essentially of a triblock copolymer vehicle, and a dye or pigment, and wherein the triblock copolymer is polyethylene oxide distearate or a polyamide distearate.

3. An ink composition in accordance with claim 1 wherein said dye or pigment is present in an amount of from about 0.05 to about 20 weight percent.

4. An ink composition in accordance with claim 1 wherein said dye or pigment is present in an amount of from about 1 to about 10 weight percent.

5. An ink composition in accordance with claim 1 wherein said dye or pigment is a cyan, magenta, yellow, blue, green, brown, black dye or pigment, or mixtures thereof.

6. A process which comprises (a) providing an acoustic ink printer having a pool of liquid ink with a free surface, and a printhead including at least one droplet ejector for radiating the free surface of said ink with focused acoustic radiation to eject individual droplets of ink therefrom on demand, said radiation being brought to focus with a finite waist diameter in a focal plane, said ink comprising a triblock copolymer, a dye and/or pigment and optional ink additives; and (b) causing droplets of said ink to be ejected onto a recording sheet in an imagewise pattern.

7. A hot melt ink composition consisting essentially of a triblock copolymer vehicle, and a dye or pigment, and wherein said triblock copolymer is of the formula

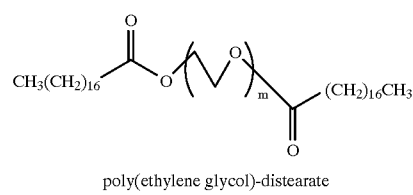

poly(ethylene glycol)-distearate or is of the formula

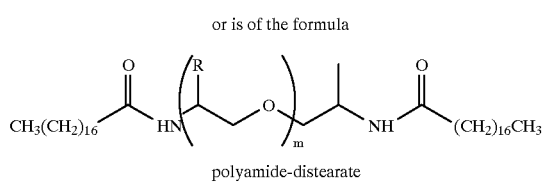

polyamide-distearate

8. An acoustic hot melt ink composition comprising essentially of a triblock copolymer vehicle, and a dye or pigment, and wherein said triblock copolymer is of the formula

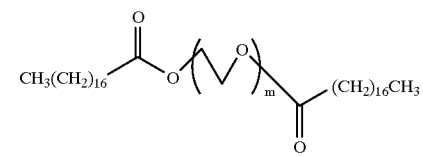

poly(ethylene glycol)-distearate or is of the formula

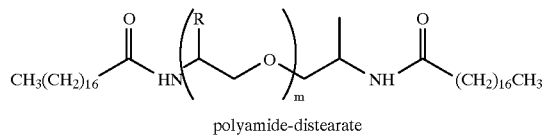

polyamide-distearate

9. An acoustic hot melt ink composition consisting essentially of a triblock copolymer vehicle and a colorant, and wherein the triblock copolymer is of the formula

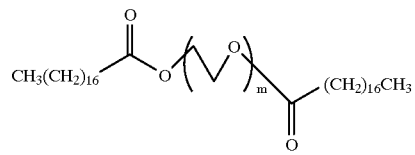

poly(ethylene glycol)-distearate or is of the formula

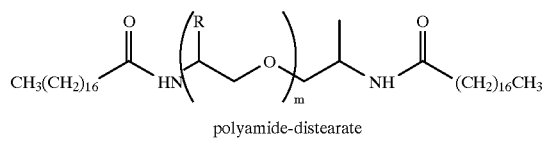

polyamide-distearate

10. A hot melt ink composition consisting essentially of a triblock copolymer vehicle, and a dye or pigment, and wherein said dry triblock copolymer is of the formula A-B-A wherein A, B and A represent monomer segments, and wherein said A-B-A triblock is

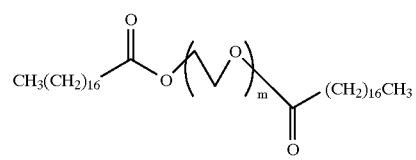

Poly(ethylene glycol)-Distearate

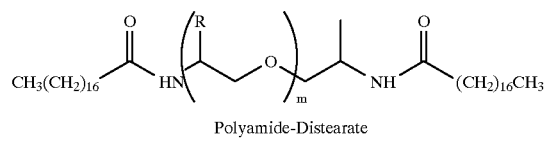

Polyamide-Distearate polyoxyethylene-polydimethylsiloxane, polyoxyethylene-polyethylene, or polymethylacrylate-polydimethylsiloxane.

11. A hot melt ink composition consisting essentially of a triblock copolymer vehicle, and a dye or pigment, and wherein said vehicle is poly(ethylene glycol)-distearate with a molecular weight $M_w$ of 1,130 grams per mole, poly (ethylene glycol)-distearate with a molecular weight $M_w$ of 1,530 grams per mole, JEFFAMINE-distearate of molecular weight $M_w$ of 720 grams per mole, JEFFAMINE-distearate of molecular weight $M_w$ of 760 grams per mole, JEFFAMINE-distearate with a $M_w$ of 930 grams per mole, JEFFAMINE-distearate of molecular weight $M_w$ of 1,130 grams per mole, or JEFFAMINE-distearate with a molecular weight $M_w$ of 1,430 grams per mole.

12. An ink in accordance with claim 11 wherein the viscosity thereof respectively of the resulting inks are 6.0 centipoise, 8.1 centipoise, 7.0 centipoise, 7.0 centipoise, 7.1 centipoise, 8.4 centipoise, or 9.7 centipoise and which viscosity is at a temperature of 160 degrees centigrade.

13. A process which comprises (a) providing an acoustic ink printer having a pool of liquid ink with a free surface, and a printhead including at least one droplet ejector for radiating the free surface of said ink with focused acoustic radiation to eject individual droplets of ink therefrom on demand, said radiation being brought to focus with a finite waist diameter in a focal plane, said ink comprising a triblock copolymer vehicle, and a dye or pigment and wherein the triblock copolymer is of the following alternative formulas

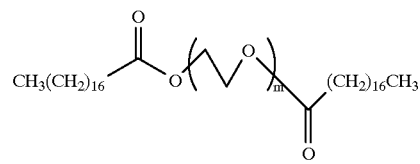

poly(ethylene glycol)-distearate

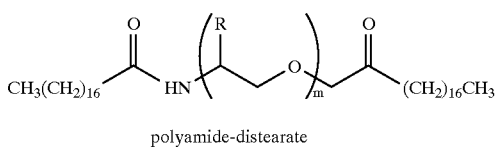

polyamide-distearate and (b) causing droplets of said ink to be ejected onto a recording sheet in an imagewise pattern.

14. A process which comprises (a) providing an acoustic ink printer having a pool of liquid ink with a free surface, and a printhead including at least one droplet ejector for radiating the free surface of said ink with focused acoustic radiation to eject individual droplets of ink therefrom on demand, said radiation being brought to focus with a finite waist diameter in a focal plane, said ink comprising a triblock copolymer vehicle, and a dye or pigment and wherein the triblock copolymer is polyethylene oxide distearate or a polyamide distearate; and (b) causing droplets of said ink to be ejected onto a recording sheet in an imagewise pattern.

15. A process which comprises (a) providing an acoustic ink printer having a pool of liquid ink with a free surface, and a printhead including at least one droplet ejector for radiating the free surface of said ink with focused acoustic radiation to eject individual droplets of ink therefrom on demand, said radiation being brought to focus with a finite waist diameter in a focal plane, said ink comprising a triblock copolymer vehicle, and a colorant, and wherein the triblock copolymer is of the formula

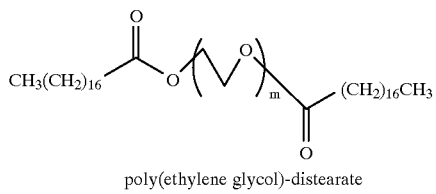

poly(ethylene glycol)-distearate or is of the formula

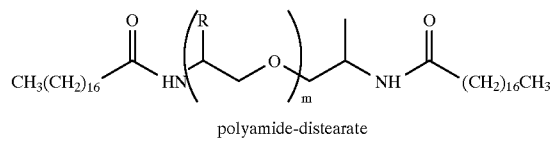

polyamide-distearate and (b) causing droplets of said ink to be ejected onto a recording sheet in an imagewise pattern.

16. A process which comprises (a) providing an acoustic ink printer having a pool of liquid ink with a free surface, and a printhead including at least one droplet ejector for radiating the free surface of said ink with focused acoustic radiation to eject individual droplets of ink therefrom on demand, said radiation being brought to focus with a finite waist diameter in a focal plane, said ink comprising a triblock copolymer vehicle, and a dye or pigment and wherein said dry triblock copolymer is of the formula A-B-A wherein A, B and A represent monomer segments, and wherein said A-B-A triblock is

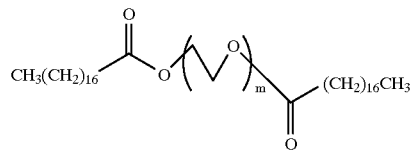

Poly(ethylene glycol)-Distearate

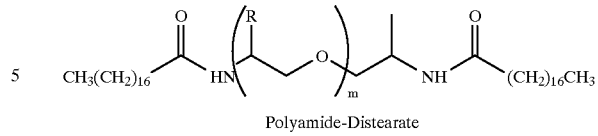

Polyamide-Distearate polyoxyethylene-polydimethylsiloxane, polyoxyethylene-polyethylene, or polymethylacrylate-polydimethylsiloxane; and (b) causing droplets of said ink to be ejected onto a recording sheet in an imagewise pattern.

17. A process which comprises (a) providing an acoustic ink printer having a pool of liquid ink with a free surface, and a printhead including at least one droplet ejector for radiating the free surface of said ink with focused acoustic radiation to eject individual droplets of ink therefrom on demand, said radiation being brought to focus with a finite waist diameter in a focal plane, said ink comprising a triblock copolymer vehicle, and a dye or pigment and wherein said wherein said vehicle is poly(ethylene glycol)-distearate with a molecular weight $M_w$ of 1,130 grams per mole, poly(ethylene glycol)-distearate with a molecular weight $M_w$ of 1,530 grams per mole, JEFFAMINE-distearate of molecular weight $M_w$ of 720 grams per mole, JEFFAMINE-distearate of molecular weight $M_w$ of 760 grams per mole, JEFFAMINE-distearate with a $M_w$ of 930 grams per mole, JEFFAMINE-distearate of molecular weight $M_w$ of 1,130 grams per mole, or JEFFAMINE-distearate with a molecular weight $M_w$ of 1,430 grams per mole; and (b) causing droplets of said ink to be ejected onto a recording sheet in an imagewise pattern.

* * * * *